United States Patent
Tisne et al.

(10) Patent No.: US 10,598,824 B2
(45) Date of Patent: Mar. 24, 2020

(54) OPHTHALMIC LENS WITH REDUCED WARPAGE

(71) Applicant: ESSILOR INTERNATIONAL (COMPAGNIE GENERALE D'OPTIQUE), Charenton le Pont (FR)

(72) Inventors: Séverine Tisne, Dudley, MA (US); Steven Weber, Dallas, TX (US); Aref Jallouli, Dudley, MA (US); Hao Wen Chiu, Dudley, MA (US); Paresh Kitchloo, Dudley, MA (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/528,263

(22) PCT Filed: Nov. 20, 2014

(86) PCT No.: PCT/IB2014/003035
§ 371 (c)(1),
(2) Date: May 19, 2017

(87) PCT Pub. No.: WO2016/079561
PCT Pub. Date: May 26, 2016

(65) Prior Publication Data
US 2017/0371075 A1    Dec. 28, 2017

(51) Int. Cl.
*G02B 1/04* (2006.01)
*B29D 11/00* (2006.01)
*G02C 7/12* (2006.01)
*B29C 45/14* (2006.01)
*B29K 33/00* (2006.01)

(52) U.S. Cl.
CPC ........ *G02B 1/041* (2013.01); *B29D 11/00009* (2013.01); *B29D 11/00865* (2013.01); *B29D 11/00923* (2013.01); *G02C 7/12* (2013.01); *B29C 45/14* (2013.01); *B29K 2033/12* (2013.01); *B29K 2995/0034* (2013.01); *G02C 2202/16* (2013.01)

(58) Field of Classification Search
CPC .......... G02B 1/04; G02B 1/041; B29C 45/14; G02C 7/12; G02C 7/02; G02C 7/04; G02C 7/10; G02C 2202/16; B29K 33/00; B29K 2033/12; B29K 2995/0034; B29D 11/00; B29D 11/00009; B29D 11/00865; B29D 11/00923
USPC ...... 351/49, 159.01, 159.59, 159.62, 159.74, 351/159.75, 159.73, 159.8
See application file for complete search history.

(56) References Cited

U.S. PATENT DOCUMENTS

| | | | |
|---|---|---|---|
| 5,316,791 A | 5/1994 | Farber et al. | 427/164 |
| 6,489,028 B1 | 12/2002 | Degand et al. | 428/423.1 |
| 6,503,631 B1 | 1/2003 | Faverolle et al. | 428/447 |
| 6,558,586 B1 | 5/2003 | Padiou et al. | 264/1.7 |
| 2004/0080824 A1 | 4/2004 | Phillips et al. | 359/487.02 |

(Continued)

OTHER PUBLICATIONS

Notice of Intention to Grant issued in Corresponding European Patent Application No. 14838793, dated Jul. 5, 2019.

*Primary Examiner* — Jie Lei
(74) *Attorney, Agent, or Firm* — Norton Rose Fulbright US LLP

(57) ABSTRACT

Ophthalmic lens comprising an ophthalmic thermoplastic substrate and a light polarizing structure onto said substrate. The ophthalmic lens reduced warpage, in particular when submitted to mechanical, thermal and/or chemical treatment.

10 Claims, 1 Drawing Sheet

(56) References Cited

U.S. PATENT DOCUMENTS

2007/0195422 A1 8/2007 Begon et al. .................. 359/642
2011/0130535 A1 6/2011 Yonemura et al. ........... 526/272

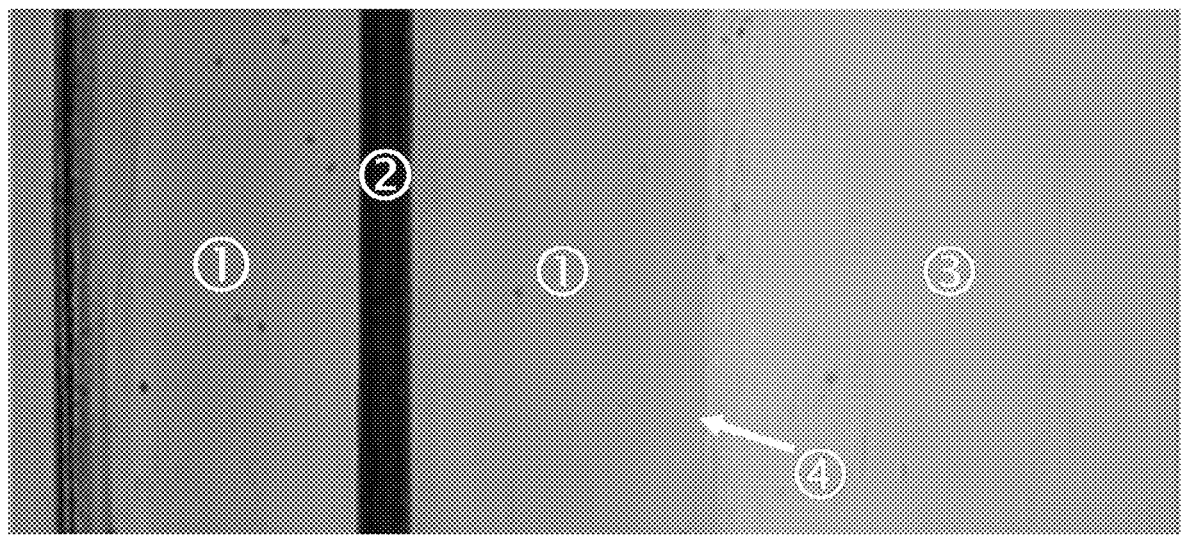

OPHTHALMIC LENS WITH REDUCED WARPAGE

CROSS-REFERENCE TO RELATED APPLICATIONS

This application is a national phase application under 35 U.S.C. § 371 of International Application No. PCT/IB2014/003035 filed 20 Nov. 2014, the entire contents of which is specifically incorporated by reference herein without disclaimer.

FIELD OF THE INVENTION

The present invention pertains to an ophthalmic lens comprising an ophthalmic thermoplastic substrate and a light polarizing structure onto said substrate. The ophthalmic lens of the present invention presents reduced warpage, in particular when submitted to mechanical, thermal and/or chemical treatment.

BACKGROUND OF THE INVENTION

Various functional structures and coatings are combined with ophthalmic substrates to impart or modify ophthalmic lens characteristics, other than optical power or magnification characteristics, Some examples of functional properties include light polarization, photochromism, tint, color, decor, hardness, and abrasion resistance.

The functional structures can be adhesively bonded to the lens by lamination onto the ophthalmic substrate. Alternatively the ophthalmic substrate can be casted or injection molded onto the functional structure.

Such functionalized ophthalmic lenses can undergo additional processing such as grinding to prescription strength and/or be subjected to additional coating processes for mechanical or optical enhancement, as described in EP1175280. Surface machining and surface smoothing create high mechanical pressure and stress on lenses, which may release molded-in residual stresses. Coating can be done in many ways. but usually a lens undergoes several steps: cleaning in chemical baths, coating with radiation and/or heat curable compositions and curing. Heating lenses may also release molded-in residual stresses. Other processing steps may be used, like annealing, lamination, tinting, edging, mounting.

Such additional processing steps may result in warpage of the lens. Warpage is a distortion where the surfaces of the molded part do not follow the intended shape of the molding design. Warpage results from molded-in residual stresses and anisotropic materials properties which are released during further processing steps like surfacing or coating. Warpage is identified by the bending of the lens in one direction more than the other, which deforms the lens like a "potato chip", resulting in a change in lens curvature.

Warpage is a well-known phenomenon in molding industry. In optics, molded objects like memory disks or contact lenses are very sensitive to shape distortions. Molding processes have thus been developed to avoid warpage, in which applied pressure, cooling rate and duration of each steps are precisely defined. By this way, molded-in residual stresses are limited by a proper process design. However, such process conditions are slow and limit productivity of molding machines. In addition, these processes do not apply well to composite molded products, in which two different materials with different dilatation rates are in direct contact.

Ophthalmic lenses comprising a thermoplastic substrate and a light polarizing structure are well known. To ensure a good adhesion between these elements various solutions have been developed. For instance, adhesives are laid between substrate and light polarizing structure. Such adhesives are often sensitive to water or oily materials and have poor optical properties. Alternatively, the external layer of the light polarizing structure is selected so as to fuse with the thermoplastic substrate. When the same material is used as thermoplastic substrate and external layer, there is no more interface: delamination is avoided but warpage can still occur because polarizing structure (very often a highly stretched film) presents residual stresses.

After intensive research the inventors have developed an ophthalmic lens that does not show the drawbacks mentioned above.

BRIEF DESCRIPTION OF THE FIGURE

The FIGURE is a microscopy view of the structure of lens obtained in Example 4. 1) polycarbonate external layer of the light polarizing structure (300 µm thick); 2) PVA impregnated with iodine functional film (30µm thick); 3) Thermoplastic substrate; 4) Direct bond between thermoplastic substrate and external layer of the light polarizing structure.

DESCRIPTION OF THE INVENTION

A first object of this invention is an ophthalmic lens comprising:
a) a thermoplastic substrate and;
b) a light polarizing structure comprising a film made of polyvinylalcohol wherein the thermoplastic substrate is made of a resin composition comprising units resulting from:
at least one (C1-C10) alkyl (meth)acrylate monomer;
at least one cyclic anhydride monomer;
and at least one vinyl aromatic monomer.

Another aspect of the present invention is a process for making such ophthalmic lens.

Another aspect of the invention is the use of the above mentioned resin composition in the manufacture of ophthalmic lenses.

A last aspect of the invention is a method for minimizing warpage of an ophthalmic lens.

DETAILED DESCRIPTION

In the present invention, an ophthalmic lens is an optical element disposed in, on or near the eye of a wearer and aims at correcting wearer's vision, protecting wearer's eyes and/or enhance wearer's vision. Non limiting examples of ophthalmic lenses include non-corrective (also called plano or afocal lens) and corrective lenses, including single vision or multi-vision lenses like bifocal, trifocal or progressive lenses, which may be either segmented or non-segmented. Ophthalmic lenses may be semi-finished lenses or finished lenses.

In the present invention warpage is measured with a lens clock following the Lens Clock Method described in ANSI Z80.1 standard. The variation of curvature during a processing step has to be less than 1.5 diopter, preferably less than 0.75 diopter, with values reported in diopter at 1.53 refractive index In the present invention "thermoplastic substrate" means a thermoplastic substrate suitable for optical applications. In particular, the thermoplastic substrate is based on poly (meth)acrylate polymers.

In ophthalmic applications poly(meth)acrylates are thermoplastic materials of particular interest. Due to their thermoplastic properties, they can be formed by low cost processes. Besides, poly(meth)acrylates have adequate optical properties for ophthalmic applications: refractive index, Abbe number, Yellow Index, low birefringence, tintability. Further, radical polymerization of acrylates is versatile and compositions may be changed easily to obtain polymers with specific properties.

By poly(meth)acrylate, it is meant a polymer obtained by polymerization of acrylate monomers and/or methacrylate monomers in a main part, and optionally of other monomers having an unsaturated bond suitable for radical copolymerization with acrylate and methacrylate like vinyl, vinyl aromatics, acrylamide, unsaturated cyclic structures.

Among the poly(meth)acrylate based substrates, the inventors have discovered that some specific poly(meth)acrylate based polymers are even more particularly suitable for warpage prevention of optical lens. In addition, the inventors have discovered that traditional anti-abrasion coatings adhere very strongly to the substrate made of said specific poly(meth)acrylate polymers.

Thus, the thermoplastic substrate useable for the present invention is made of a resin composition comprising units resulting from:
  at least one (C1-C10) alkyl (meth)acrylate monomer;
  at least one cyclic anhydride monomer;
  and at least one vinyl aromatic monomer.

Consequently, the present invention is directed to an ophthalmic lens comprising:
  a) a thermoplastic substrate and;
  b) a light polarizing structure comprising a film made of polyvinylalcohol, wherein the thermoplastic substrate is made of a resin composition comprising units resulting from:
  at least one (C1-C10) alkyl (meth)acrylate monomer;
  at least one cyclic anhydride monomer;
  and at least one vinyl aromatic monomer.

In a preferred embodiment, the resin composition comprises:
  75-99.8% of (C1-C10) alkyl(meth)acrylate monomer;
  0.1-15% of cyclic anhydride monomer; and
  0.1-10% of vinyl aromatic monomer; these percentages being relative to the total weight of the resin composition.

The alkyl(meth)acrylate monomer usable in the present invention is preferably chosen in the group constituted of methyl methacrylate, ethyl methacrylate, propyl methacrylate, isopropyl methacrylate, n-butyl methacrylate, isobutyl methacrylate, t-butyl methacrylate, and 2-ethylhexyl methacrylate, and is preferably methyl methacrylate.

The cyclic anhydride monomer usable in the present invention is preferably chosen in the group constituted of maleic anhydride, methylmaleic anhydride, dimethylmaleic anhydride, dichloromaleic anhydride, bromomaleic anhydride, dibromomaleic anhydride, phenylmaleic anhydride and diphenylmaleic anhydride and glutaric acid anhydride and is preferably maleic acid anhydride.

Cyclic anhydride structures in the resin may also be obtained after polymerization of the resin components by formation of an anhydride from two neighbouring, preferably in beta position, acid or ester functions on the backbone of the polymer.

The vinyl aromatic monomer usable in the present invention is preferably chosen in the group constituted of styrene, 2-methyl styrene, 3-methyl styrene, 4-methyl styrene, 2,4-dimethyl styrene, 2,5-dimethyl styrene, 2-methyl-4-chlorostyrene, 2,4,6-trimethyl styrene, [alpha]-methyl styrene, cis-[beta]-methyl styrene, trans-[beta]-methyl styrene, 4-methyl-[alpha]-methyl styrene, 4-fluoro-[alpha]-methyl styrene, 4-chloro-[alpha]-methyl styrene, 4-bromo-[alpha]-methyl styrene, 4-t-butyl styrene, 2-fluorostyrene, 3-fluorostyrene, 4-fluorostyrene, 2,4-difluorostyrene, 2-chlorostyrene, 3-chlorostyrene, 4-chlorostyrene, 2,4-dichlorostyrene, 2,6-dichlorostyrene, 2-bromostyrene, 3-bromostyrene, 4-bromostyrene, 2,4-dibromostyrene, [alpha]-bromostyrene, [beta]-bromostyrene, 2-hydroxystyrene and 4-hydroxystyrene, preferably styrene and alpha-methyl styrene, and more preferably styrene.

In a first variant of the invention, the resin composition comprises a blend of a copolymer of at least one vinyl aromatic monomer and at least one cyclic anhydride monomer, and a polymer of at least one (C1-C10) alkyl(meth)acrylate monomer.

Preferably, the resin composition usable in the present invention comprises a blend of a copolymer of styrene and maleic anhydride, and a methyl methacrylate polymer.

In a second variant of the invention, the resin composition comprises a copolymer of at least one (C1-C10) alkyl(meth)acrylate monomer, at least one cyclic anhydride monomer and at least one vinyl aromatic monomer.

Preferably, the resin composition usable in the present invention comprises a copolymer of methyl methacrylate, maleic anhydride and styrene.

The resin composition usable in the present invention may contain a mold release agent, a thermal stabilizer, an antistatic agent, a flame retardant, a heat radiation blocking agent, a UV absorber, a dye (including a fluorescent dye or a optical brightener), a pigment, a light scattering agent, a reinforcement filler, other resin, an elastomer, etc., so long as the objects of this invention are not impaired.

The resin composition may also contain a bluing agent. The bluing agent includes Macrolex Violet B and Macrolex Blue RR both supplied by Bayer AG and Polysynthren Blue RLS supplied by Clariant Corporation.

The resin composition may have a glass transition temperature (Tg) above 110° C., preferably above 115° C., more preferably of at least 120° C., and a tensile modulus (E) above 3200 MPa, preferably of at least 3500 MPa.

The resin composition may also have a deflection temperature (DTL) under load at 1.8 MPa of at least 100° C. and preferably of at least 105° C.

Besides, the resin composition can show a surface energy of above 52 mN/m and a polar ratio of above 21%, wherein these values are measured after three successive cleaning steps, which each consist in dipping said substrate into an aqueous basic solution or an alcoholic solution and rinsing the substrate with water.

The ophthalmic lens in the present invention comprises a light polarizing structure. The light polarizing structure useable to the present invention comprises a polymer film made of polyvinylalcohol (PVA). The PVA film is typically drawn uniaxially and is impregnated with at least one colorant (dichroic compounds or iodinated compounds).

In a preferred embodiment, the light polarizing structure usable for the present invention comprises a film made of polyvinylalcohol which is covered by at least one external layer. The polyvinyl alcohol film is preferably interposed between two external layers: a first external layer and a second external layer. In a particularly preferred embodiment, the light polarizing structure comprises a film made of polyvinylalcohol, said film being interposed between a first external layer and a second external layer of thermoplastic materials.

Each external layer of the light polarizing structure can consist in one layer or several sub-layers, each layer or sub-layer being independently selected from the group consisting of polycarbonate, polymethyl methacrylate, cellulose triacetate, cellulose acetate butyrate, cellulose acetate, cyclic olefin copolymer, norbornene containing olefin polymer, polyurethane, and polyethylene terephthalate.

In a specific embodiment both external layers are made of the same material, for example a single layer of polycarbonate.

In another specific embodiment both external layers are made of the same poly(meth)acrylate.

In another specific embodiment both external layers are made of different poly(meth)acrylates, i.e. poly(meth)acrylates resulting from different monomer compositions.

The first external layer may be attached to the functional film by a first adhesive and the second external layer by a second adhesive. Materials suitable for use as the first adhesive and the second adhesive must have good optical properties, including high optical transparencies, no yellowing upon exposure to sunlight, an ability to flex during injection molding without becoming crazed, minimal shrinkage during curing. Some examples of suitable materials for the first adhesive and the second adhesive include acrylic-type, epoxy-type, PVA type and urethane-type adhesives. The materials used for the first adhesive and the second adhesive may be pressure sensitive adhesives or curable adhesive by thermal or ultraviolet light treatment.

Said first and second adhesives may include functional properties such as photochromism, impact resistance, UV protection, blue cut filter or other filter able to selectively cut specific range of wavelengths.

In a preferred embodiment the light polarizing structure comprises, and even more preferably is, a polyvinylalcohol film impregnated with iodine and two external layers made of polycarbonate in the following order: PC/PVA/PC. Adhesives may be added between the PVA light polarizing film and external layers, for instance a PVA based adhesive.

The thickness of the first external layer and second external layer may be from 80 µm to 1 mm, preferably 100 µm to 500 µm. The thickness of the functional film may be from 10 µm to 1.5 mm, depending on the type of functional films. Typically, PVA light polarizing films have a thickness from 10 µm to 150 µm, preferably from 20 µm to 80 µm.

As mentioned above for the general embodiment, the first external layer and the thermoplastic substrate are preferably made of different materials. In particular, the first external layer and the thermoplastic substrate can be made of different poly(meth)acrylate based materials.

In the present invention, thermoplastic substrate and the first external layer of light polarizing structure are directly bonded. By "directly bonded" it is meant that there is no adhesive between the thermoplastic substrate and the first external layer (i.e the external layer of the light polarizing structure is in direct contact with the thermoplastic substrate).

The ophthalmic lenses according to the invention may further comprise a hard coat layer on the side of the thermoplastic substrate opposite to the light polarizing structure and/or on the side of the light polarizing structure which is not in contact with the thermoplastic substrate. This hard coat may be deposited by any method well known in the art, such as dip coating, spray coating, spin coating, etc.

Abrasion-resistant coatings usable in the present invention are already described in the prior art.

For example, U.S. Pat. Nos. 4,211,823, 5,619,288, EP 1 301 560 or EP 0 614 957 describe abrasion-resistant monolayer coating compositions containing hydrolyzed silanes and aluminum compounds, and coated articles resistant to abrasion and impacts.

The abrasion-resistant monolayer may be selected from polymerizable UV coating like polymerizable (meth)acrylic or epoxy(meth)acrylic monomers or sol-gel coating comprising as the main constituents an epoxyalkoxysilane such as, for example, γ-glycidoxypropyltrimethoxysilane (GLYMO) and optionally a dialkyldialkoxysilane such as, for example, dimethyldiethoxysilane (DMDES), colloidal silica and a catalyst amount of a curing catalyst such as aluminum acetylacetonate or a hydrolysate thereref, the remaining of the composition being essentially comprised of solvents typically used for formulating these compositions.

U.S. Pat. Nos. 5,316,791, 6,503,631 and 6,489,028 describe a combined bi-layer impact-resistant and anti-abrasion system, comprising respectively a primer coating of cured polyurethane or poly(meth)acrylic latex or latex containing butadiene units to which an abrasion-resistant coating is applied.

Suitable latex layer used in the present invention is an aqueous dispersion of polyurethane such as commercially available aqueous polyurethane dispersions W-240 and W-234 (supplied by Baxenden Chemicals). According to a preferred embodiment of the invention the abrasion-resistant bi-layer coating comprises a first layer which is the preferred primer latex layer described hereinbefore, and preferably an aqueous dispersion of polyurethane, and a second layer which is the preferred abrasion-resistant monolayer described hereinbefore.

The ophthalmic lens of this invention can be obtained by conventionally existing molding methods such as injection molding, injection press molding, etc.

In particular the ophthalmic lens can be obtained by placing the light polarizing structure beforehand in a mold to be used for molding, injecting the molten resin composition into the mold and carrying out molding.

A further object of the present invention relates to a process for manufacturing an ophthalmic lens comprising the steps of:

a) inserting a light polarizing structure into a mold, b) injecting onto the light polarizing structure a molten resin composition to carry out molding, said molten resin composition comprising units resulting from:

at least one (C1-C10) alkyl (meth)acrylate monomer;

at least one cyclic anhydride monomer;

and at least one vinyl aromatic monomer;

c) allowing said resin composition to cool so as to form a thermoplastic substrate onto the light polarizing structure; and d) ejecting the ophthalmic lens.

In step a) the light polarizing structure is placed in the lower mold half. Said light polarizing structure is as defined previously. The light polarizing structure has typically a thickness from about 150 μm to about 1.5 mm. It may be plano, i.e. has a zero power. It may be a plane surface for very low base curve molds, or may be curved in a performing step. The base curve of the preformed light polarizing structure may for example match with the base curve of the mold or may be close to the base curve of the mold. Preferentially the light polarizing structure is preformed with a curvature close to the curvature of the mold.

In step b), the mold is closed. The molten resin is injected into the cavity via an edge gate. The edge gate may be modified to insure the resin is injected on top of the light polarizing structure. The resin is injected at very high pressure, in the range of 344.73 bar to 1034.21 bar (5,000 psi to 15,000 psi). The molten resin may enter the cavity at temperature in the range of 215.6° C. to 260° C. (420° F. to 500° F.). Depending on the material used in the light polarizing structure, the molten resin may soften the upper surface of the light polarizing structure. This softening results in an integral bonding between the light polarizing structure and the resin as the resin solidifies.

In step c), the resin begins to cool to the mold solidification temperature, and integrally forms a functionally enhanced ophthalmic lens. During this phase, a packing pressure may be utilized for a span of time. Once the lens is sufficiently rigid to resist deformation, the mold is opened and the ensemble is ejected in step d).

This process enables to get an ophthalmic lens wherein the thermoplastic substrate and the first external layer of the light polarizing structure are directly bonded with an interface easily visible in optical microscopy. The thus obtained ophthalmic lens shows advantageously a warpage of less than 0.75 diopter.

The process of the present invention can further comprise a step of:

coating with a hard coat at least the side of the thermoplastic substrate opposite to the light polarizing structure, or coating with a hard coat simultaneously the side of the thermoplastic substrate opposite to the light polarizing structure (which represents the rear face of the ophthalmic lens) and the side of the light polarizing structure which is not in contact with the thermoplastic substrate (which represents the front face of the ophthalmic lens).

In such a process the warpage of the lens is advantageously less than 0.75 diopter.

A further object of the present invention is the use of a resin composition comprising units resulting from:

at least one (C1-C10) alkyl (meth)acrylate monomer;

at least one cyclic anhydride monomer;

and at least one vinyl aromatic monomer, in the manufacture of a functional ophthalmic lens comprising:

a) a thermoplastic substrate and;

b) a light polarizing structure comprising a film made of polyvinylalcohol.

The present invention also relates to a method for minimizing warpage of a functional ophthalmic lens comprising:

a) a thermoplastic substrate and;

b) a light polarizing structure comprising a film made of polyvinylalcohol, wherein said method comprises the step of injection molding a resin composition comprising units resulting from:

at least one (C1-C10) alkyl (meth)acrylate monomer;

at least one cyclic anhydride monomer;

and at least one vinyl aromatic monomer; onto said light polarizing structure.

EXAMPLES

Semi-Finished Single Vision 4.25 base lenses were injection molded in a mold with the following steps, using five Polymethylmethacrylate based resins listed in Table 1:

Put a preformed light polarizing structure in the lower mold half; the base curve of the light polarizing structure is close to the base curve of the mold; the light polarizing structure is a PC/Adh/PVA/Adh/PC structure where PC is a 300 μm polycarbonate film, Adh is a PVA based adhesive and PVA is a Polyvinylalcohol film impregnated with iodine;

Close the mold;

Actuate the molten resin injection cycle: Melt Pressure around 965 bar (14,000 psi), Melt Temperature around 232° C. (450° F.), Mold temperature around 99° C. (210° F.), Cooling time from 250 to 350 sec, Screw speed at 100 rpm;

At the end of the lens molding cycle, open the mold and eject the lens.

Lenses are then surfaced to plano lenses with a center thickness of 2.0 mm. FIG. 1 presents a microscopy view of the structure of these lenses. The lens has been cross-sectioned by band saw then microtome sectioned to expose the interface between the light polarizing structure and the thermoplastic substrate. A clear interface can be seen.

TABLE 1

| Example | Substrate material |
|---------|-------------------|
| 1 | PMMA[a] |
| 2 | Copolymer PMMA/PBA[b] |

TABLE 1-continued

| Example | Substrate material |
|---------|-------------------|
| 3 | Copolymer PMMA/PBA[c] |
| 4 | Copolymer PMMA/SMA[d] |
| 5 | Blend PMMA/SMA[e] |

PMMA: polymethylmethacrylate
PBA: Polybutylacrylate
SMA: Styrene-Maleic Anhydride
[a]8N from EVONIK (Tg: 115° C.; E: 3200 MPa; DTL: 100° C.)
[b]ZK-F from EVONIK (Tg: 105° C.; E: 2250 MPa; DTL: 91° C.)
[c]ZK-X from EVONIK (Tg: 108° C.; E: 2500 MPa; DTL: 93° C.)
[d]HW 55 from EVONIK (Tg: 122° C.; E: 3600 MPa; DTL: 106° C.)
[e]FT 15 from EVONIK (Tg: 121° C.; E: 3500 MPa; DTL: 105° C.)

1. Surface Energy and Polar Component Ratio Measurement

The surface energy and polar component ratio were measured for lenses from examples 1, 2 and 4 at each successive cleaning step, which consists in dipping said substrate into an aqueous basic solution or an alcoholic solution and rinsing the substrate with water.

The surface energy is determined with the Young equation which links the surface energy of substrate to contact angles of droplets of liquid deposited on said substrate. The contact angles are measured with a KRUSS DSA100 (Drop Shape Analysis System) equipped with software version DSA1, using following reference liquids: water and diiodomethane, at temperature: 23±5° C. and humidity: 50±10%. The measurements were made on lens face opposite to the light polarizing structure.

The polar component ratio is determined according to the Owen, Wendt, Rabel and Kaeble model.

The results are shown in table 2:

TABLE 2

| Step | Example 1 | | | | Example 2 | | | | Example 4 | | | |
|------|---|---|---|---|---|---|---|---|---|---|---|---|
| | 0 | 1 | 2 | 3 | 0 | 1 | 2 | 3 | 0 | 1 | 2 | 3 |
| Surface Energy. | 48.02 | 51.61 | 49.51 | 49.74 | 44.73 | 50.09 | 47.61 | 43.14 | 48.09 | 55.47 | 52.75 | 57.09 |
| Dispersive | 39.95 | 40.67 | 41.56 | 41.03 | 38.26 | 41.62 | 40.63 | 39.37 | 39.11 | 42.7 | 43.18 | 43.35 |
| Polar | 8.07 | 10.94 | 7.95 | 8.44 | 6.47 | 8.47 | 6.98 | 3.77 | 8.98 | 12.77 | 9.57 | 11.74 |
| Polar ratio (%) | 16.8 | 21.2 | 16.1 | 17.0 | 14.5 | 16.9 | 14.7 | 8.7 | 18.7 | 23.0 | 18.1 | 21.3 |

The "PMMA/SMA" substrate exhibits a higher initial surface energy and experienced an increase in surface energy and the polar ratio after the cleaning process with a surface energy increase from 48 to 57 mN/m and a polar ratio increase from 18.7% to 21.3%.

The other PMMA resins exhibit lower initial surface energies and polar component ratios. Even though they showed an increase in surface energy and Polar ratio after the 1st cleaning step, a decrease was observed after each subsequent cleaning step and final surface energy values and Polar ratios are just slightly higher or lower than the initial values; and overall lower than 50 Nm/m and 17%.

2. Adhesion Measurement

The lenses from examples 1 to 5 were coated on the side of the thermoplastic substrate opposite to the light polarizing structure with the following hard coat process:
deposition of a primer latex layer obtained in accordance with the protocol described in example 1 of U.S. Pat. No. 5,316,791 and using the commercially available W-240 aqueous dispersion of polyurethane. This overlayer is deposited by dip-coating and then is cured at 85° C. for 4 minutes; the thickness of the layer is 1 μm;
deposition of an abrasion-resistant monolayer made according to example 3 of the patent EP 0 614 957 B 1. This layer comprises, with respect to the total weight of the composition, 22% of glycidoxypropylmethyl-dimethoxysilane, 62% of colloidal silica, containing 30% solids in methanol, and 0.70% of aluminum acetylacetonate, the balance essentially consisting of water and conventional solvents.

Then, adhesion of coating on substrate on the face of the lens opposite to the light polarizing structure is determined according to the dry crosshatch test before and after 80 hours of QSun exposure: exposure of lenses with a center thickness of 2.0 mm with a Xenon lamp fitted with a Q-filter to approximate outdoor solar exposure. Intensity is measured at 340 nm with a target of 0.68 W/m$^2$. The lower the score, the better the adhesion: 0 corresponds to excellent adhesion. The results are shown in Table 3.

TABLE 3

| | Adhesion | |
|---|---|---|
| Example | Before Qsun | After Qsun |
| 1 | 5 | — |
| 2 | 5 | — |
| 3 | 5 | — |
| 4 | 0 | 0 |
| 5 | 0 | 0 |

The hardcoat showed good adhesion on the lens of examples 4 and 5.

3. Warpage Measurement

Warpage was measured after molding, after surfacing and after coating with a lens clock following the Lens Clock Method described in ANSI Z80.1 standard. The values are reported in Diopter at 1.53 refractive index and represent the deviation of the curvature during process. The results are shown in table 4:

TABLE 4

| Example | Warpage after coating (diopter) |
|---------|---------------------------------|
| 1 | 1.50 |
| 2 | 1.50 |
| 3 | More than 1.5 |
| 4 | 0-0.75 |
| 5 | 0-0.75 |

The lowest amount of warpage after coating, i.e. after whole process, was observed for the lenses made of the "PMMA/SMA" resin grades.

The invention claimed is:

1. An ophthalmic lens comprising:
   a thermoplastic substrate made of a resin composition comprising units resulting from polymerization of at least the three following monomers:
      at least one (C1-C10) alkyl (meth)acrylate monomer;
      at least one cyclic anhydride monomer; and
      at least one vinyl aromatic monomer; and
   a light polarizing structure comprising a film made of polyvinylalcohol;
   wherein the (C1-C10) alkyl (meth)acrylate monomer is methyl methacrylate, the cyclic anhydride monomer is maleic acid anhydride, and the vinyl aromatic monomer is styrene.

2. The ophthalmic lens of claim 1, wherein the light polarizing structure comprises a film made of polyvinylalcohol interposed between a first external layer and a second external layer of thermoplastic materials, wherein each external layer of the light polarizing structure comprises one layer or several sub-layers, each layer or sub-layer independently further defined as comprising a polycarbonate, polymethyl methacrylate, cellulose triacetate, cellulose acetate butyrate, cellulose acetate, cyclic olefin copolymer, norbornene containing olefin polymer, polyurethane, and/or polyethylene terephthalate.

3. The ophthalmic lens of claim 1, wherein the resin composition comprises a blend of
   a copolymer of styrene, maleic anhydride, and methyl methacrylate.

4. The ophthalmic lens of claim 1, wherein the resin composition is a copolymer styrene, maleic anhydride and methyl methacrylate.

5. The ophthalmic lens of claim 1, wherein the thermoplastic substrate has:
   a glass transition temperature above 110° C. and a tensile modulus above 3200 MPa; and/or
   a deflection temperature under load at 1.8 MPa of at least 100°.

6. The ophthalmic lens of claim 1, wherein the thermoplastic substrate has a surface energy above 52 mN/m and a polar ratio above 21%, as measured after three successive cleanings, each cleaning consisting of dipping the substrate into an aqueous basic solution or an alcoholic solution and rinsing the substrate with water.

7. The ophthalmic lens of claim 1, wherein the ophthalmic lens further comprises a hard coat layer on a side of the thermoplastic substrate opposite to the light polarizing structure.

8. A process for manufacturing an ophthalmic lens of claim 1 comprising:
   inserting a light polarizing structure into a mold;
   injecting onto the light polarizing structure a molten resin composition to carry out molding, wherein the molten resin composition comprises units resulting from at least the three following monomers:
      at least one (C1-C10) alkyl (meth)acrylate monomer;
      at least one cyclic anhydride monomer; and
      at least one vinyl aromatic monomer;
   allowing the resin composition to cool so as to form a thermoplastic substrate onto the light polarizing structure; and
   ejecting the ophthalmic lens,
   wherein the (C1-C10) alkyl (meth)acrylate monomer is methyl methacrylate, the cyclic anhydride monomer is maleic acid anhydride, and the vinyl aromatic monomer is styrene.

9. The process of claim 8, wherein the process further comprises coating at least a side of the thermoplastic substrate opposite to the light polarizing structure with a hard coat.

10. A method for minimizing warpage of a functional ophthalmic lens comprising a thermoplastic substrate and a light polarizing structure comprising a film made of polyvinylalcohol, wherein the method comprises injection molding a resin composition comprising units resulting from at least the three following monomers:
    at least one (C1-C10) alkyl (meth)acrylate monomer;
    at least one cyclic anhydride monomer; and
    and at least one vinyl aromatic monomer;
onto the light polarizing structure;
wherein the (C1-C10) alkyl (meth)acrylate monomer is methyl methacrylate, the cyclic anhydride monomer is maleic acid anhydride, and the vinyl aromatic monomer is styrene.

* * * * *